United States Patent
Chen et al.

(10) Patent No.: US 10,332,244 B2
(45) Date of Patent: Jun. 25, 2019

(54) METHODS AND APPARATUSES FOR ESTIMATING AN AMBIGUITY OF AN IMAGE

(71) Applicant: Nuctech Company Limited, Beijing (CN)

(72) Inventors: Zhiqiang Chen, Beijing (CN); Yuanjing Li, Beijing (CN); Ziran Zhao, Beijing (CN); Yaohong Liu, Beijing (CN); Jianping Gu, Beijing (CN); Zhiming Wang, Beijing (CN)

(73) Assignee: Nuctech Company Limited, Beijing (CN)

( * ) Notice: Subject to any disclaimer, the term of this patent is extended or adjusted under 35 U.S.C. 154(b) by 72 days.

(21) Appl. No.: 15/610,930

(22) Filed: Jun. 1, 2017

(65) Prior Publication Data

US 2018/0040115 A1 Feb. 8, 2018

(30) Foreign Application Priority Data

Aug. 5, 2016 (CN) .......................... 2016 1 0634657

(51) Int. Cl.
*G06T 7/00* (2017.01)

(52) U.S. Cl.
CPC .. *G06T 7/0002* (2013.01); *G06T 2207/20016* (2013.01); *G06T 2207/20064* (2013.01); *G06T 2207/30168* (2013.01)

(58) Field of Classification Search
CPC ......... G06T 7/0002; G06T 2207/30168; G06T 2207/20016; G06T 2207/20064
See application file for complete search history.

(56) References Cited

U.S. PATENT DOCUMENTS

| 6,611,627 | B1 * | 8/2003 | LaRossa | ................... G06T 5/10 382/240 |
| 7,894,668 | B1 * | 2/2011 | Boitano | .................. G06T 5/007 382/168 |
| 2011/0286628 | A1 * | 11/2011 | Goncalves | ........ G06F 17/30256 382/103 |

(Continued)

OTHER PUBLICATIONS

Saha, Ashirbani, et al., "Utilizing image scales towards totally training free blind image quality assessment", IEEE Transactions on Image Processing 24.6, (2015), 1879-1892.

(Continued)

*Primary Examiner* — Ming Y Hon
(74) *Attorney, Agent, or Firm* — Schwegman Lundberg & Woessner, P.A.

(57) ABSTRACT

A method and an apparatus for estimating an image fuzziness are provided. The method may comprise: acquiring an image; obtaining a multi-scale representation of the image by performing a multi-scale transform on the image; calculating gradients of the image and a normalized histogram of the gradients at each scale based on the multi-scale representation; calculating error vectors between the normalized histogram of gradients at each scale and a normalized original histogram of gradients of the image; performing a weighted summing on the error vectors by using respective weights to obtain a summed result, wherein the weights are determined based on a reciprocal of the sums of squares of the gradients of the image at each scale; estimating the ambiguity of the image based on the summed result.

8 Claims, 4 Drawing Sheets

(56) References Cited

U.S. PATENT DOCUMENTS

| | | | | |
|---|---|---|---|---|
| 2012/0230591 A1* | 9/2012 | Shibata | ............... | G06T 5/005 |
| | | | | 382/195 |
| 2012/0314957 A1* | 12/2012 | Narikawa | .......... | G06K 9/00288 |
| | | | | 382/195 |
| 2016/0284100 A1* | 9/2016 | Sharma | .................... | G06T 7/11 |
| 2016/0364849 A1* | 12/2016 | Liu | ...................... | G06T 7/0004 |

OTHER PUBLICATIONS

Serir, Amina, et al., "No-reference blur image quality measure based on multiplicative multiresolution decomposition", Journal of visual communication and image representation 24.7, (2013), 911-925.

Soleimani, Seyfollah, et al., "Efficient blur estimation using multi-scale quadrature filters", Signal processing 93.7, (2013), 1988-2002.

Vu, Phong V, et al., "A fast wavelet-based algorithm for global and local image sharpness estimation", IEEE Signal Processing Letters 19.7, (2012), 423-426.

\* cited by examiner

METHODS AND APPARATUSES FOR ESTIMATING AN AMBIGUITY OF AN IMAGE

CLAIM FOR PRIORITY

The present application claims the benefit of priority of Chinese Application Serial No. 201610634657.2, filed Aug. 5, 2016, which is incorporated herein by reference in its entirety.

TECHNICAL FIELD

The present application relates to estimation of an ambiguity of an image, and in particular to a no-reference image ambiguity estimation method and apparatus.

BACKGROUND

In various imaging systems, due to factors such as lack of focus, a relative motion between the system and an object, a cross-crosstalk of a detector and the like, images may be blurred, thereby degrading an image quality of the images, which may further affect visual effects and subsequent feature extraction and identification of the images. An image ambiguity can be quantitatively estimated by evaluation algorithms. The evaluation algorithms can be used in image quality monitoring and auto focusing of the imaging systems, and can further improve effects of subsequent image processing algorithms.

The methods for evaluating the image quality may comprise image quality evaluating methods with references, with semi-references, or with no-reference. In consideration of the fact that a non-degraded clear image can not be obtained in practical application, a method of evaluating an image ambiguity with no reference is more practical. The no-reference image ambiguity evaluation method may include an edge-based method, a pixel-based statistical information method, a transform domain-based method, and so on. The methods for evaluating the image ambiguity based on edge analysis may have an advantage of its concept being intuitive and its calculation being relatively simple. However, the method has a certain dependence on the image. When there is no sharp edge in an original image, the method becomes inaccurate. The methods for evaluating the image ambiguity based on the ambiguity of pixels may utilize statistical information of the image and thus may have a good robustness. However, the method ignores position information of the pixels, and the noise (especially, impulse noise) in the image will form a strong gradient value, which will affect the evaluation greatly. The methods for evaluating the image ambiguity based on transform domain take frequency domain characteristics and multi-scale characteristics into account. Some of the methods even utilize spatial information, thus, may have a good accuracy and robustness. However, neither of the methods does use a characteristic of the consistency among image information on different scales, and many methods still need to train a regression function, which may cause inconveniences to practical usage.

SUMMARY

In view of one or more problems in the prior art, a method and an apparatus for estimating an ambiguity of an image are proposed.

According to one aspect of the disclosure, a method for estimating an ambiguity of an image is provided, which may comprise steps of: acquiring the image; obtaining a multi-scale representation of the image by performing a multi-scale transform on the image; calculating gradients of the image and a normalized histogram of the gradients at each scale based on the multi-scale representation; calculating error vectors between the normalized histogram of gradients at each scale and a normalized original histogram of gradients of the image; performing a weighted summing on the error vectors by using respective weights to obtain a summed result, wherein the weights are determined based on a reciprocal of the sums of squares of the gradients of the image at each scale; and estimating the ambiguity of the image based on the summed result.

According to embodiments of the disclosure, the normalized histogram of gradients at each scale may comprise at least one of: a normalized histogram of horizontal gradients, a normalized histogram of vertical gradients and a normalized histogram of diagonal gradients.

According to embodiments of the disclosure, the step of calculating the normalized histogram of gradients may comprise calculating the normalized histogram of gradients and the original normalized histogram of gradients for respective color channel, for a color image.

According to embodiments of the disclosure, the step of estimating the ambiguity of the image based on the summed result may comprise: performing the weighted summing on the error vectors at each scale to obtain a summed vector; calculating a mean and a standard deviation of the summed vector; and obtaining the ambiguity of the image, by calculating a sum of the mean and the standard deviation and multiplying the sum by a constant value.

According to embodiments of the disclosure, the multi-scale transform may comprise a wavelet transform or other multi-scale transforms.

According to another aspect of the disclosure, an apparatus for estimating an ambiguity of an image is provided, which may comprise a processor configured to: acquire an image; obtain a multi-scale representation of the image by performing a multi-scale transform on the image; calculate gradients of the image and a normalized histogram of the gradients at each scale based on the multi-scale representation; calculate error vectors between the normalized histogram of gradients at each scale and a normalized original histogram of gradients of the image; perform a weighted summing on the error vectors by using respective weights to obtain a summed result, wherein the weights are determined based on a reciprocal of the sums of squares of the gradients of the image at each scale; and estimate the ambiguity of the image based on the summed result.

The methods and apparatus discussed in the above embodiments can have a good effect on estimating the ambiguity of various images. The evaluation effect of LIVE, TID2008, CSIQ, IVC and other public databases in the industry are highly related with the results of human observation.

In addition, the methods of the above-described embodiments evaluate an inherent influence of the image ambiguity on the images, and need not to perform any training in advance, so that its estimating effect does not depend on any training data. This may enable a good versatility and stability, and it may have better performance over the current no-reference image quality evaluation method.

BRIEF DESCRIPTION OF THE DRAWINGS

For a better understanding of the present invention, embodiments of the present invention will be described in accordance with the following drawings.

DETAILED DESCRIPTION

Reference will now be made in detail to the specific embodiments of the present invention. It should be noted that the embodiments described herein are for illustrative purposes only and are not intended to limit the present invention. In the following description, numerous specific details are set forth in order to provide a thorough understanding of the present invention. However, it will be apparent to those skilled in the art that it is unnecessary to practice the present invention with these specific details. In other instances, well-known structures, materials or methods have not been specifically described in order to avoid obscuring the present invention.

In view of the above problems, an embodiment of the present invention proposes a fast and efficient no-reference image ambiguity evaluation method. By extracting histogram features of the image gradients at different scales, and comparing these features with the original image features at each scale, the image ambiguity can be estimated in quantity. Using this evaluation result, various factors which may influence the image quality may be analyzed and compared, the image quality may be improved by using softwares or hardwares, so as to facilitate subsequent image processing, or processes of evaluating and dynamically monitoring the quality stability of the imaging system.

According to an embodiment of the present invention, a method for estimating an ambiguity of an image based on a consistency of a wavelet transform and a ratio of squares of a L1 norm and a L2 norm of image multi-scale gradients is proposed, which does not require manual selection and labeling of data, and also does not need any training. This method is a fast and effective no-reference image ambiguity evaluation method.

For example, in an embodiment of the present invention, the multi-scale representation of the image is obtained based on the wavelet transform. Gradients of the image and a normalized histogram of the gradients at each scale is calculated based on the multi-scale representation. Then, error vectors between the normalized histogram of gradients and a normalized original histogram of gradients of the image at each scale are calculated. Next, absolute error vectors are calculated and weighted by using the square of the L2 norm of the gradients. Finally the image ambiguity is estimated by using the mean and standard deviation of the error vector. The whole estimation process does not require either selecting the image data manually, or observing the evaluation data by human. Due to a relatively small calculation amount, the process can automatically and quickly perform the process of estimating the image ambiguity.

Figure 1:
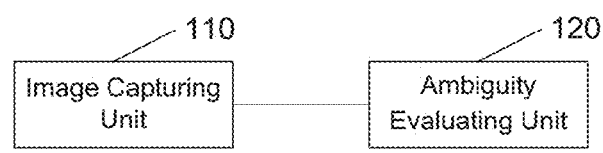
FIG. 1 is a structural diagram illustrating an system for estimating an ambiguity of an image according to an embodiment of the disclosure.

FIG. 1 is a structural diagram illustrating an system for estimating an ambiguity of an image according to an embodiment of the disclosure. As shown in FIG. 1, in the embodiment of the present invention, the image capturing unit 110 is implemented with for example, a visible light image capturing device or other image capturing device such as a X-ray imaging device. The image obtained by the image capturing unit 110 is input to an ambiguity evaluating unit 120 to perform an image ambiguity evaluation process according to the embodiment of the present invention.

Figure 2:
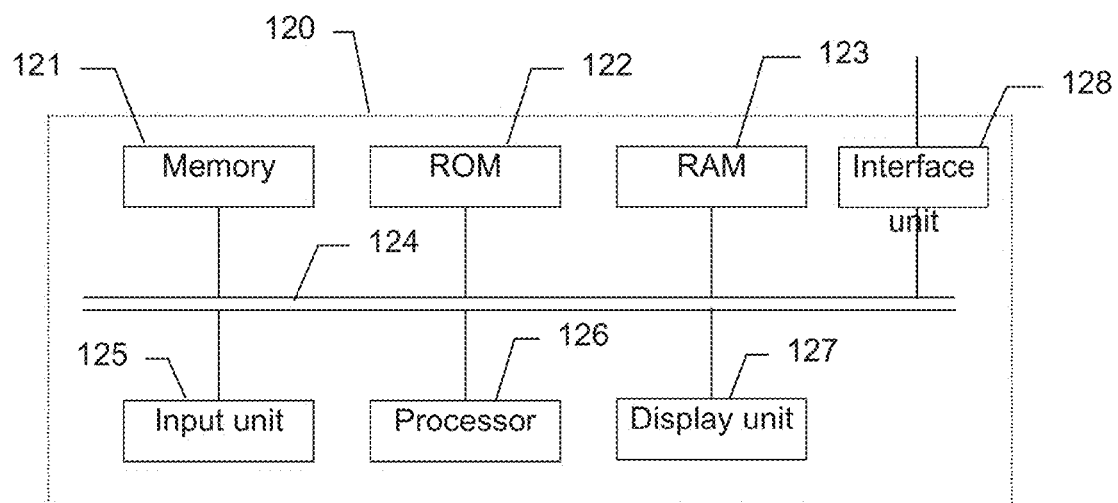
FIG. 2 is a structural diagram illustrating an image processing apparatus as shown in FIG. 1.

FIG. 2 shows a structural diagram of the ambiguity evaluating unit 120 shown in FIG. 1. As shown in FIG. 2, the image capturing unit 110 stores the inputted data in a memory 121 through an interface unit 128 and a bus 124. A Read Only Memory (ROM) 122 is used to store configuration information and various programs of a computer data processor. A Random Access Memory (RAM) 123 is used to temporarily store various data while the processor 126 is in operation. In addition, the memory 121 may also store computer programs for data processing. The bus 124 is connected to the memory 121, the ROM 122, the RAM 123, the input unit 125, the processor 126, the display unit 127, and the interface unit 128 discussed above.

The instruction code of the computer program may instruct the processor 126 to execute a predetermined image ambiguity evaluation method after inputting an operation command via the input unit 125 such as a keyboard and a mouse. After obtaining a result of the data processing, the result is displayed on the display unit 127 such as a LCD display, or is outputted in a form of a hard copy such as printing.

Figure 3:
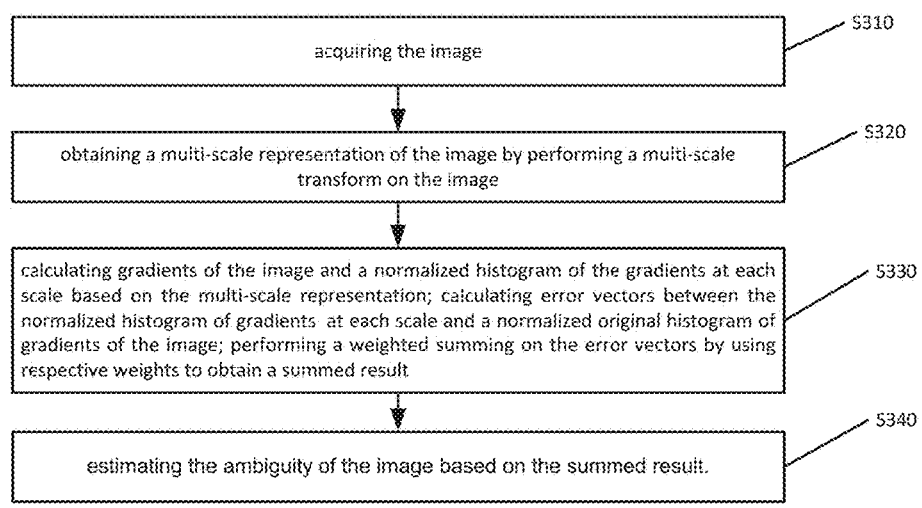
FIG. 3 is a flow chart illustrating an method for estimating an ambiguity of an image according to an embodiment of the disclosure.

FIG. 3 is a flow chart illustrating an method for estimating an ambiguity of an image according to an embodiment of the disclosure. As shown in FIG. 3, at step S310, an image to be evaluated is acquired. At step S320, a multi-scale representation of the image is obtained by performing a multi-scale transform on the image. For example, the multi-scale representation of the image is obtained by performing a wavelet transform or other multi-scale transformations.

At step 3330, firstly, gradients of the image and a normalized histogram of the gradients at each scale are calculated based on the multi-scale representation; and then error vectors between the normalized histogram of gradients at each scale and a normalized original histogram of gradients of the image are calculated. Next, a weighted summing on the error vectors is performed by using respective weights to obtain a summed result, wherein the weights are determined based on a reciprocal of the sums of squares of the gradients of the image at each scale. According to some embodiments, the gradient in the X direction, the Y direction and the diagonal direction ($G_x$, $G_y$, $G_d$) are calculated for an input image (for a multi-channel color image, the gradients should be calculated channel by channel):

$$\begin{cases} G_x(i,j) = I(i+1,j) - I(i,j) \\ G_y(i,j) = I(i,j+1) - I(i,j) \\ G_d(i,j) = I(i+1,j+1) - I(i,j) \end{cases} \quad (1)$$

$H\_G_{x0}$, $H\_G_{y0}$, $H\_G_{d0}$ are obtained by counting the normalized histogram of each gradient graph (i.e., the sum of all coefficients in the histogram is equal to 1).

According to an embodiment of the present invention, when calculating characteristics of the input image at the original scale, the gradients of the image in the X direction, the Y direction, and the diagonal direction are firstly calculated. Then, the range and dimension of the gradient histogram are determined. For example, for a typical 256 level gray-scale image, the gradient histogram is in the range of [−255~255]. 511 dimensions of histogram should be statistically counted for the gradient image of the three directions, and then normalized, that is, divided by the total number of gradients to set the sum of all coefficients in the histogram equal to 1.

Then, a N-level wavelet transform is applied to the image. Three high-frequency coefficients $[cH_n, cV_n, cD_n]$ should be obtained after the $n^{th}$ ($1 \leq n \leq N$) transform. At this time, the gradients in the X direction, the Y direction and the diagonal direction $[GH_{xn}, GH_{yn}, GH_{dn}]$, $[GV_{xn}, GV_{yn}, GV_{dn}]$ and $[GD_{xn}, GD_{yn}, GD_{dn}]$ can be calculated. Then, $[H\_GH_{xn}, H\_GH_{yn}, H\_GH_{dn}]$, $[H\_GV_{dn}, H\_GV_{yn}, H\_GV_{dn}]$ 和 $[H\_GD_{xn}, H\_GD_{yn}, H\_GD_{dn}]$ can be obtained by statistically counting the normalized histogram. Thus, the absolute error vectors of the histogram can be calculated as:

$$\begin{cases} D_{xn}(i) = \max(|H\_G_{x0}(i) - H\_GH_{xn}(i)|, |H\_G_{x0}(i) - H\_GV_{xn}(i)|, \\ \quad |H\_G_{x0}(i) - H\_GD_{xn}(i)|) \\ D_{yn}(i) = \max(|H\_G_{y0}(i) - H\_GH_{yn}(i)|, |H\_G_{y0}(i) - H\_GV_{yn}(i)|, \\ \quad |H\_G_{y0}(i) - H\_GD_{yn}(i)|) \\ D_{dn}(i) = \max(|H\_G_{d0}(i) - H\_GH_{dn}(i)|, |H\_G_{d0}(i) - H\_GV_{dn}(i)|, \\ \quad |H\_G_{d0}(i) - H\_GD_{dn}(i)|) \end{cases} \quad (2)$$

The three absolute error vectors of the histogram are weighted by the inverse of the square of its L2 norm to obtain a final error vector:

$$D_n(i) = D_{xn}(i) / (|GH_{xn}(i)|_2^2 + |GH_{yn}(i)|_2^2 + |GH_{dn}(i)|_2^2) / K + \\ D_{yn}(i) / (|GV_{xn}(i)|_2^2 + |GV_{yn}(i)|_2^2 + |GV_{dn}(i)|_2^2) / K + \\ D_{dn}(i) / (|GD_{xn}(i)|_2^2 + |GD_{yn}(i)|_2^2 + |GD_{dn}(i)|_2^2) / K \quad (3)$$

In the above equation (3), K is the dimension of the histogram, that is, the length of the histogram vector.

For example, the image is decomposed by a N-level wavelet transform (typically, N=4). For each high-frequency images at each scale, the gradients in the X direction, the Y direction and the diagonal direction are calculated. Thus, nine histograms should be obtained at each scale, and all histograms are normalized.

Then, the error vectors between the three X-direction gradient histograms and the original scale X-direction gradient histograms are calculated for each scale, and the value of each point takes an maximum of the three absolute errors vectors. A weighted summing on the error vectors is performed by using respective weights to obtain a summed result, wherein the weights are reciprocals of results which are obtained by dividing the squares of the L2 norms of the gradients in the three directions by the total number of gradient pixels (i.e. a mean of the gradient squares). The same processing is performed for the direction and the diagonal direction. Then the three weighted vectors are summed to obtain the error vector at this scale.

At step S340, the image ambiguity is estimated based on the error vector obtained by performing the weighted summing at each scale. For example, for each scale, the same calculation is performed, and all the error vectors are accumulated to obtain a final error vector D. The final error vector at all scales is as follows:

$$D = \sum_{i=1}^{N} D_n \quad (4)$$

Based on this final error vector, the quantitative ambiguity estimation value Q can be obtained, by multiplying the sum of the mean and standard deviation of the final error vector with a constant c:

$$Q = c \cdot (\text{mean}(D) + \text{std}(D)) \quad (5)$$

Figure 4:
FIG. 4 is an example of a clear image (score 0.00) according to an embodiment of the present invention.

In equation (5), c is a positive number (typically, c=100), which only affects the range of the evaluation result. The smaller the value, the clearer the image is, and the larger the value, the blurrier the image is. FIG. 4 is an example of a clear image (score 0.00) according to an embodiment of the present invention.

Figure 5:
FIG. 5 is an example of a slightly-blurred image (score 3.69) according to an embodiment of the present invention.
Figure 6:
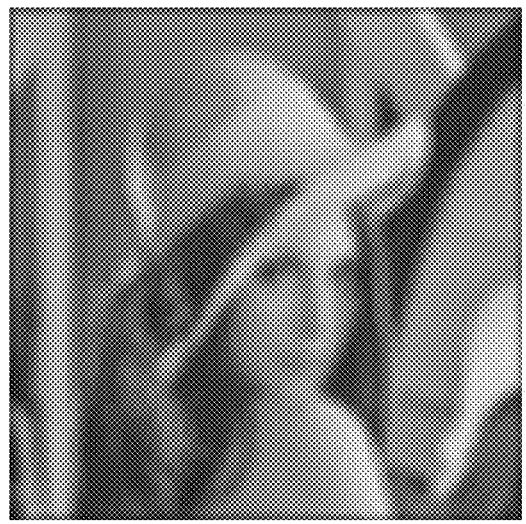
FIG. 6 is an example of a moderately-blurred image (score 40.23) according to an embodiment of the present invention.
Figure 7:
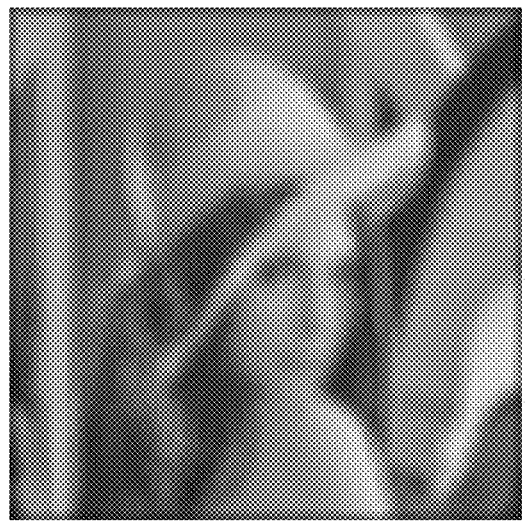
FIG. 7 is an example of a severely-blurred image (score 92.77) according to an embodiment of the present invention.

FIG. 5 is an example of a slightly-blurred image (score 3.69) according to an embodiment of the present invention. FIG. 6 is an example of a moderately-blurred image (score 40.23) according to an embodiment of the present invention. FIG. 7 is an example of a severely-blurred image (score 92.77) according to an embodiment of the present invention. As can be seen from FIGS. 4 to 7, the image perceived by human observers becomes blurred as the value of ambiguity increases.

Although gradients in a horizontal direction, a vertical direction and a diagonal direction are described as examples in the above-described embodiments, it will be understood by those skilled in the art that the gradients in other directions may be calculated or only a gradient in one certain direction is taken into account. For example, only the gradient in the moving direction is taken into account, so as to estimate the ambiguity in the moving direction.

In addition, although the above description has been described by taking a wavelet transform as an example, it will be understood by those skilled in the art that the use of other multi-scale transformations is also possible.

Compared with the conventional no-reference image ambiguity evaluation methods, the image ambiguity evaluation method of the above-described embodiments has the following advantages: (1) Good Evaluation Effects. The methods and apparatus discussed in the above embodiments can have a good effect on estimating the ambiguity of various images. The evaluation effect of LIVE, TID2008, CSIQ, IVC and other public databases in the industry are highly related with the results of human observation. (2) Versatility and Stability. The methods of the disclosure evaluate an inherent influence of the image ambiguity on the images, and need not to perform any training in advance, so that its estimating effect does not depend on any training data. This may enable a good versatility and stability, therefore, it may have better performance over the current no-reference image quality evaluation method. (3) High Execution Speed. The methods only need to perform a wavelet transform, a gradient calculation and a histogram statistics, and there is no need for the time-consuming convolution operation or other local block processing process, which may enable a simple feature extraction process and a high evaluation speed. For a typical 768*1024 image, the evaluating time is less than 0.1 second.

In addition, the methods of the above embodiments only needs to perform operations such as a wavelet transform, a gradient calculation and a histogram statistics, and there is no need for the time-consuming convolution operation or other local block processing process, which may enable a simple feature extraction process and a high evaluation speed Detailed description of the invention has been described by using a schematic diagram, a flowchart, and/or an example. In a case that such schematics, flowcharts, and/or examples include one or more functions and/or operations, those skilled in the art will appreciate that each function and/or operation in such a schematic, flow diagram or example can be realized by any combination of various structures, hardware, software, firmware, or substantially any of them independently and/or collectively. In one embodiment, several parts of the subject matter described in the embodiments of the present invention may be implemented by application specific integrated circuits (ASICs), field programmable gate arrays (FPGAs), digital signal processors (DSPs), or other integrated formats. However, those skilled in the art will recognize that some aspects of the embodiments disclosed herein may be implemented equivalently in an integrated circuit as a whole or a part of it, implemented as one or more computer programs running on one or more computers (e.g., implemented as one or more programs running on one or more computer systems), implemented as one or more programs running on one or more processors (e.g., implemented as one or more programs running on one or more microprocessors), implemented as firmware, or substantially implemented in any combination of the above-described manners, and those skilled in the art will incorporate capabilities for designing such circuit and/or writing such software and/or firmware code in accordance with the present disclosure. In addition, those skilled in the art will recognize that the mechanisms of the subject matter described herein can be distributed as various forms of program product. Regardless of the particular type of signal bearing medium that is actually used to perform the distribution, exemplary embodiments are applicable. Examples of signal bearing media may include, but are not limited to, recordable type media such as floppy disks, hard disk drives, compact disks (CDs), digital versatile disks (DVDs), digital tapes, computer memories, and the like; and transmission type media such as digital and/or analog communication media (e.g., fiber optic cables, waveguides, wired communication links, wireless communication links, etc.).

While the present invention has been described with reference to several exemplary embodiments, it is to be understood that the terminology used herein is illustrative and exemplary, but not limiting. As the present invention can be embodied in many forms without departing from the spirit or substance of the invention, it is to be understood that the above-described embodiments are not limited to any of the foregoing details, but are to be construed broadly within the spirit and scope of the appended claims. All changes and modifications that fall within the spirit and scope of the claims or the equivalents thereof are therefore intended to be embraced by the appended claims.

We claim:

1. A method for estimating an ambiguity of an image, comprising:
    acquiring the image;
    obtaining a multi-scale representation of the image by performing a multi-scale transform on the image;
    calculating histograms of gradients for the image at each scale based on the multi-scale representation;
    calculating normalized histogram of the gradients at each scale from the histograms of gradients for the image;
    calculating error vectors between the normalized histogram of gradients at each scale and a normalized original histogram of gradients of the image, respectively;
    performing a weighted summing on the error vectors by using respective weights to obtain a summed result, wherein the weights are determined based on a reciprocal of sums of squares of the gradients for the image at each scale; and
    estimating the ambiguity of the image based on the summed result;
    wherein the estimating the ambiguity of the image based on the summed result comprises:
    performing the weighted summing on the error vectors at each scale to obtain a summed vector;
    calculating a mean and a standard deviation of the summed vector; and
    obtaining the ambiguity of the image, by calculating a sum of the mean and the standard deviation and multiplying the sum by a constant value.

2. The method of claim 1, wherein the normalized histogram of gradients at each scale comprises at least one of: a normalized histogram of horizontal gradients, a normalized histogram of vertical gradients and a normalized histogram of diagonal gradients.

3. The method of claim 1, wherein the calculating the normalized histogram of gradients comprises: calculating the normalized histogram of gradients and the original normalized histogram of gradients for respective color channel, for a color image.

4. The method of claim 1, wherein the multi-scale transform comprises a wavelet transform.

5. An apparatus for estimating an ambiguity of an image, comprising a processor configured to:
    acquire an image;
    obtain a multi-scale representation of the image by performing a multi-scale transform on the image;
    calculate histograms of gradients for the image at each scale based on the multi-scale representation;
    calculate normalized histogram of the gradients at each scale from the histograms of gradients for the image;
    calculate error vectors between the normalized histogram of gradients at each scale and a normalized original histogram of gradients of the image respectively;
    perform a weighted summing on the error vectors by using respective weights to obtain a summed result, wherein the weights are determined based on a reciprocal of sums of squares of the gradients for the image at each scale; and
    estimate the ambiguity of the image based on the summed result;
    wherein the processor is further configured to:
    perform the weighted summing on the error vectors at each scale to obtain a summed vector;
    calculate a mean and a standard deviation of the summed vector; and
    obtain the ambiguity of the image, by calculating a sum of the mean and the standard deviation and multiplying the sum by a constant value.

6. The apparatus of claim 5, wherein the normalized histogram of gradients at each scale comprises at least one of: a normalized histogram of horizontal gradients, a normalized histogram of vertical gradients and a normalized histogram of diagonal gradients.

7. The apparatus of claim 5, wherein the processor is further configured to calculate the normalized histogram of gradients and the original normalized histogram of gradients for respective color channel, for a color image.

8. The apparatus of claim 5, wherein the multi-scale transform comprises a wavelet transform.

* * * * *